United States Patent [19]

Dougherty et al.

[11] Patent Number: 5,691,430
[45] Date of Patent: Nov. 25, 1997

[54] PROCESS FOR MAKING VINYL ETHER POLYMERS

[75] Inventors: James A. Dougherty, Pequannock; John G. Mc Kittrick, Jersey City; Raymond Bret Clark, Bloomfield, all of N.J.

[73] Assignee: ISP Investments Inc., Wilmington, Del.

[21] Appl. No.: 697,463

[22] Filed: Aug. 26, 1996

[51] Int. Cl.$^6$ ........................................................ C08F 4/26
[52] U.S. Cl. .......................... 526/103; 526/107; 526/194; 526/332
[58] Field of Search ..................... 526/130, 103, 526/107, 194, 332

[56] References Cited

U.S. PATENT DOCUMENTS 3,285,896  11/1966  MacKenzie et al. .
3,844,975  10/1974  Karol ........................................ 526/130

FOREIGN PATENT DOCUMENTS 0837711  6/1960  United Kingdom ................... 526/130

OTHER PUBLICATIONS

Document No. 95:43771 "Mechanical Activation of Inorganic Powders by Vibromilling" Tawai et al Allg. Chem., 476, 221–8 (English) 1981.

Primary Examiner—Joseph L. Schofer
Assistant Examiner—N. Sarofim
Attorney, Agent, or Firm—Walter Katz; Marilyn J. Maue; Joshua J. Ward

[57] ABSTRACT

A process for polymerizing a vinyl ether monomer which comprises contacting the vinyl ether with an initiator system of silicon dioxide and a one or more metallic oxides.

9 Claims, No Drawings

PROCESS FOR MAKING VINYL ETHER POLYMERS

BACKGROUND OF THE INVENTION

1. Field of the Invention

This invention relates to a process for polymerizing vinyl ethers, and, more particularly, to a heterogeneous initiator system for effecting such polymerization in an efficient manner.

2. Description of the Prior Art

Polymers of vinyl ethers and catalytic processes to prepare these polymers have been described in the art. See U.S. Pat. Nos. 3,228,923; 3,365,433; 3,394,116; 3,461,075; 3,819,596; and 5,055,536, in which various heterogeneous catalysts such as molecular sieves and zeolites were used in the initiator system. Vinyl ethers also have been polymerized in the presence of strong Lewis acids such as boron trifluoride. However, none of these processes are entirely satisfactory With respect to providing a substantially colorless polyvinyl ether product under advantageous reaction conditions, and in which the resulting polymer has an advantageous molecular weight and polydispersity.

Accordingly, it is an object of this invention to provide a process for making colorless vinyl ether polymers having a predetermined weight average molecular weight and polydispersity, and which is made in a substantially quantitative yield under advantageous reaction rate and temperature conditions.

A specific object herein is to provide such a polymerization process using a unique heterogeneous initiator system.

These and other objects of the invention will be made apparent from the following description of the invention.

SUMMARY OF THE INVENTION

What is described herein is a process for polymerizing vinyl ether monomers using a heterogeneous initiator system which includes silicon dioxide and one or more metallic oxides.

DETAILED DESCRIPTION OF THE INVENTION

The process of this invention is carried out by contacting a vinyl ether monomer having the formula:

$H_2C=CH-OR$, where R is alkyl, cycloalkyl or alkyl substituted cycloalkyl, aromatic or alkyl substituted aromatic; containing 1–20 carbon atoms in the presence of a heterogeneous initiator system of silicon dioxide and about 0.01 to about 1% by weight thereof of a metallic oxide such as aluminum oxide, magnesium oxide, ferric oxide and titanium dioxide, such as is present in sea sand or kaolin, at about 20° to about 100° C., preferably about 50°–95° C.

Suitable vinyl ether monomers for use herein include lower alkyl vinyl ethers such as methylvinyl ether, ethylvinyl ether, propylvinyl ether, butylvinyl ether and higher alkylvinyl ethers such as dodecylvinyl ether. Copolymers of different vinyl ethers or copolymers with one or more vinyl ethers and one or more other comonomers also may be prepared by the process of the invention. Accordingly, copolymers of different vinyl ethers and of vinyl ethers and other comonomers may be of block, random, or tapered sequences and may be of radial, linear or branched structures.

The product of the invention is a substantially colorless vinyl ether polymer whose physical properties can be controlled by the particular vinyl ether monomer selected, and the reaction conditions used including the particle size of the monomer, the reaction temperature, the stirring rate and the composition of the initiator system employed.

These reaction parameters also will affect the polymerization rate. Under such selected conditions, homopolymerization is effected within a suitable reaction period without affecting the catalyst itself. Generally a residence time ranging from an immediate reaction time to about 5 minutes and up to about 3–14 days has been observed to be sufficient to provide substantially complete polymerization of the vinyl ether monomer.

The product of the polymerization reaction is a substantially colorless, viscous homopolymer of the vinyl ether monomer whose weight average molecular weight, Mw, is about 200 to 100,000, preferably 20,000 to 75,000, and the molecular weight distribution or polydispersity (Mw/Mn) is less than about 5, preferably less than about 3.

In general, the polymerization of this invention may be carried out in batch, continuous or semi-continuous operations.

BATCH PROCESSING

EXAMPLE 1

Ethylvinyl ether (EVE), 40 g (liquid), was charged to a 60 ml #15 screw-top polymerization tube. Then Fisher-brand sea sand, 0.8 g, having the following composition was added and the tube was tightly sealed. The reaction was carried out in an oven at 50° C. without stirring.

| Composition of Sea Sand | Weight % |
| --- | --- |
| Silicon Dioxide | 99.8 |
| Aluminum Oxide | 0.06 |
| Iron Oxide | 0.02 |
| Calcium Oxide | trace |
| Boron Oxide | trace |
| Titanium Oxide | 0.02 |
| Magnesium Oxide | trace |

The monomer was converted to polymer within 24 hours. After 2 weeks, the sample was completely polymerized to a colorless, viscous polymer which was identified as poly (ethylvinyl ether). The weight average molecular weight of the product was determined by gel permeation chromatography as 72,599, with a polydispersity of 2.77.

EXAMPLE 2

Example 1 was repeated using Ottawa sand in place of Fisher sea sand. The polymer was obtained within 24 hours.

EXAMPLE 3

Example 1 was repeated using Kaolin (China Clay) in place of sea sand. Rapid and violent polymerization occurred immediately.

EXAMPLE 4

Example 1 was repeated using methylvinyl ether (MVE) monomer instead of EVE. After 15 days at 50° C., a clear, colorless polymer of poly(methylvinyl ether) was obtained. The weight average molecular weight was 25,646 with a polydispersity of 2.45.

EXAMPLE 5

Example 1 was repeated using n-butylvinyl ether (BVE) as the monomer. After 1 month at 50° C., a clear, colorless polymer of poly(n-butylvinyl ether) was obtained.

EXAMPLE 6

Example 1 was repeated using dodecylvinyl ether (DDVE) monomer. After 1 month at 50° C., a clear, colorless polymer of poly(dodecylvinyl ether) was formed.

EXAMPLE 7

Example 4 was repeated using 20 g of MVE and 20 g of Fisher-brand sea sand. The desired polymer was obtained in 3 days.

EXAMPLE 8

Example 7 was repeated using 30 g of MVE and 0.01 g of Kaolin. The desired polymer was obtained in 3 days. The weight average molecular weight was 37,359 with a polydispersity of 2.8.

EXAMPLE 9

Ethylvinyl ether, 300 g was charged to a 1-liter high pressure, stainless-steel reactor. Then Fisher-brand sea sand, 35 g, in a fine mesh cage, was added. The reactor was stirred at 300 rpm, heated to 90° C., and held for 8 hours. The pressure increased to 58 psig with heating and slowly decreased to 40 psig during reaction. After 8 hours, the reactor was cooled to room temperature and the polymer was recovered. The weight average molecular weight was 52,733 with a polydispersity of 3.03.

EXAMPLE 10 n-Butylvinyl ether (BVE), 12.1 g (liquid) and methylvinyl ether (MVE), 16.1 g (liquid), and Fisher-brand sea sand, 10.1 g were charged to a 60 ml #15 screw-top polymerization tube. The tube was tightly sealed and placed in an oven at 50° C. After 17 days, a copolymer of butylvinyl ether and methylvinyl ether (27.2 g) was obtained.

CONTINUOUS FEED CONDITIONS

EXAMPLE 11

A 12-inch long, 1.125 inch ID heat exchanger was charged with 50 g of sea sand contained in a mesh filter. The exchanger was heated to 40° C. and filled with EVE. Additional EVE was forced through the heat exchanger under a pressure of about 62 psig. A 50 ml forecut was removed and the following 150 ml was collected. After removing traces of unreacted monomer, a very light yellow viscous polymer was obtained. NMR analysis confirmed the formation of poly(ethylvinyl ether). The weight average molecular weight was 40,328 with a polydispersity of 2.59.

EXAMPLE 12

Example 1 was repeated except the temperature was increased to 50° C. and the pressure was increased to about 92 psig. The resulting polymer had a weight average molecular weight of 59,227 with a polydispersity of 2.47.

EXAMPLE 13

Example 2 was repeated at 90° C. The resulting polymer had a weight average molecular weight of 42,827 with a polydispersity of 2.80.

EXAMPLES 14–19

The heat exchanger described in Example 1 was charged with 200 g of monomer whose rate of flow was accurately controlled using a syringe pump. The results are shown in the Table below.

TABLE

| Ex. # | Vinylether | T (°C.) | Flow Rate (ml/min) | % Polymer Obtained |
|---|---|---|---|---|
| 14 | EVE | 50 | 2.0 | 25.2 |
| 15 | EVE | 90 | 2.0 | 31.5 |
| 16 | EVE | 90 | 4.0 | 15.3 |
| 17 | EVE | 90 | 1.1 | 43.2 |
| 18 | EVE | 90 | 0.7 | 57.2 |
| 19 | MVE | 70 | 5.0 | 5.9 |

COMPARATIVE EXAMPLES

Example 1 was repeated except that the following individual materials were substituted for the sea sand composition, on an equal weight basis. Polymerization was not observed with any of these materials.

| Material | Result |
|---|---|
| Silicon Dioxide | No reaction after 1 week |
| Aluminum Oxide | No reaction after 1 week |
| Iron Oxide | No reaction after 1 week, EVE yellows |
| Calcium Oxide | No reaction after 1 week |
| Boron Oxide | No reaction after 1 week |
| Titanium Oxide | No reaction after 1 week, EVE yellows |
| Magnesium Oxide | No reaction after 1 week |
| Fumed Silica | No reaction after 1 week |
| Silica Gel | No reaction after 1 week |
| Silicic Acid | No reaction after 1 week, EVE yellows |
| Control (sea sand) | Polymer observed after 1 day |

While the invention has been described with particular reference to certain embodiments thereof, it will be understood that changes and modifications may be made which are within the skill of the art. Accordingly, it is intended to be bound only by the following claims, in which:

What is claimed is:

1. A process for polymerizing a vinyl ether monomer having the formula:

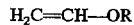

wherein R is an alkyl, cycloalkyl or alkyl substituted cycloalkyl, aromatic or alkyl substituted aromatic and R contains 1 to 20 carbon atoms, to make a homopolymer having a weight average molecular weight of about 200 to about 100,000 and a polydispersity of less than about 5 which comprises contacting the vinyl ether with an initiator system consisting essentially of silicon dioxide and one or more metallic oxides selected from the group consisting of aluminum oxide, magnesium oxide, ferric oxide, and titanium dioxide.

2. A process according to claim 1 wherein the initiator system includes about 0.01 to about 1% of said metallic oxide.

3. A process according to claim 1 wherein the vinyl ether is methylvinyl ether.

4. A process according to claim 1 wherein the homopolymer obtained is substantially clear.

5. A process according to claim 1 wherein the weight average molecular weight is about 20,000 to 75,000, and the polydispersity is less than about 3.

6. A process according to claim 1 wherein the initiator system is sea sand or kaolin.

7. A process according to claim 1 which is carried out under batch conditions.

8. A process according to claim 1 which is carried out under continuous conditions.

9. A process according to claim 1 in which the vinyl ether is a mixture of vinyl ethers.

* * * * *